United States Patent
Hui et al.

(10) Patent No.: US 8,446,349 B2
(45) Date of Patent: May 21, 2013

(54) METHOD AND SYSTEM FOR CONTROLLING DEFORMABLE MICROMIRROR DEVICES

(75) Inventors: Sue Hui, Plano, TX (US); Larry D. Dickinson, Richardson, TX (US); Gregory R. Basile, Van Alstyne, TX (US); James A. Strain, Allen, TX (US); Patrick C. Neil, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1480 days.

(21) Appl. No.: 11/945,592

(22) Filed: Nov. 27, 2007

(65) Prior Publication Data

US 2009/0135314 A1 May 28, 2009

(51) Int. Cl.
*G09G 3/34* (2006.01)

(52) U.S. Cl.
USPC .......................................................... 345/84

(58) Field of Classification Search
USPC ........... 345/100, 87, 84, 55, 30, 32, 204–206, 345/691, 697; 348/758, 759, 771, E5.137; 359/223, 224, 224.2, 237, 238, 259, 290–292, 359/295–298, 325
See application file for complete search history.

(56) References Cited

U.S. PATENT DOCUMENTS

| | | | |
|---|---|---|---|
| 7,095,547 B2 | 8/2006 | Aubuchon et al. | 359/291 |
| 2005/0134613 A1* | 6/2005 | Hui | 345/690 |
| 2006/0152106 A1* | 7/2006 | Yan et al. | 310/309 |
| 2007/0195408 A1* | 8/2007 | Divelbiss et al. | 359/462 |
| 2008/0101399 A1* | 5/2008 | Sexton et al. | 370/461 |

OTHER PUBLICATIONS

U.S. Patent Application filed May 25, 2007 entitled: "*Method and System for Controlling Spatial Light Modulator Interface Buses*", 19 pages, May 25, 2007.

* cited by examiner

*Primary Examiner* — William Boddie
*Assistant Examiner* — Jeffrey A Parker
(74) *Attorney, Agent, or Firm* — Warren L. Franz; Wade J. Brady, III; Frederick J. Telecky, Jr

(57) ABSTRACT

A method and system for controlling deformable micromirror devices are provided. In accordance with one embodiment of the present disclosure, a display system includes multiple deformable micromirror devices, a buffer, and a controller. Each deformable micromirror device includes a plurality of micromirrors. The buffer is communicatively coupled, at a first interface speed, to each deformable micromirror device. The buffer is operable to communicate in parallel with the deformable micromirror devices. The controller is communicatively coupled, at a second interface speed, to the buffer. The controller is operable to receive a display input and, in response, generate a plurality signals each corresponding to an optical characteristic of the display input. The controller is further operable to sequentially communicate each of the plurality of signals through the buffer to a corresponding one of the deformable micromirror devices. Each deformable micromirror device receives at least a subset of the plurality of signals.

10 Claims, 4 Drawing Sheets

METHOD AND SYSTEM FOR CONTROLLING DEFORMABLE MICROMIRROR DEVICES

TECHNICAL FIELD OF THE DISCLOSURE

This invention relates in general to bus controllers, and more particularly to a method and system for controlling deformable micromirror devices.

BACKGROUND OF THE DISCLOSURE

Deformable micromirror devices (DMDs) are used in a variety of applications, such as display systems and optical networks. One example of such a device is the DLP® chip made by Texas Instruments. The DLP® chip contains an array of up to two million individually addressable, micron-sized mirrors. Deformable micromirror devices, such as the DLP® chip, typically modulate light in response to signals received from a bus. In conventional systems having multiple deformable micromirror devices, each deformable micromirror device is typically coupled to a respective controller in a one-to-one ratio.

SUMMARY OF THE DISCLOSURE

A method and system for controlling deformable micromirror devices are provided. In accordance with one embodiment of the present disclosure, a display system includes multiple deformable micromirror devices, a buffer, and a controller. Each deformable micromirror device includes a plurality of micromirrors. The buffer is communicatively coupled, at a first interface speed, to each deformable micromirror device. The buffer is operable to communicate in parallel with the deformable micromirror devices. The controller is communicatively coupled, at a second interface speed, to the buffer. The controller is operable to receive a display input and, in response, generate a plurality of signals each corresponding to an optical characteristic of the display input. The controller is further operable to sequentially communicate each of the plurality of signals through the buffer to a corresponding one of the deformable micromirror devices. Each deformable micromirror device receives at least a subset of the plurality of signals.

In accordance with another embodiment of the present disclosure, a method of controlling a bus includes time division multiplexing multiple signals and communicating each signal to a respective deformable micromirror device.

Technical advantages of some embodiments of the present disclosure include various methods and systems for interfacing a controller with multiple deformable micromirror devices using time-division-multiplexed signals. In some embodiments, a shared bus interface may provide additional cost savings by further minimizing the pin counts for the controller. In addition, some such embodiments may include a controller having the same interface configuration and/or the same package dimensions as the controllers of conventional multi-controller systems, thereby facilitating system design. The time-division-multiplexed signals of various embodiments may have bit sequences optimized for particular applications.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

In accordance with the teachings of the present disclosure, a method and system for controlling deformable micromirror devices (DMDs) are provided. The method and system may be used in any of a variety of deformable micromirror devices. An example of one such deformable micromirror device is the DLP® chip made by Texas Instruments. Particular examples specified throughout this document are intended for example purposes only and are not intended to limit the scope of the present disclosure. In particular, this document is not intended to be limited to a particular deformable micromirror device, such as a DLP® chip.

Figure 1:
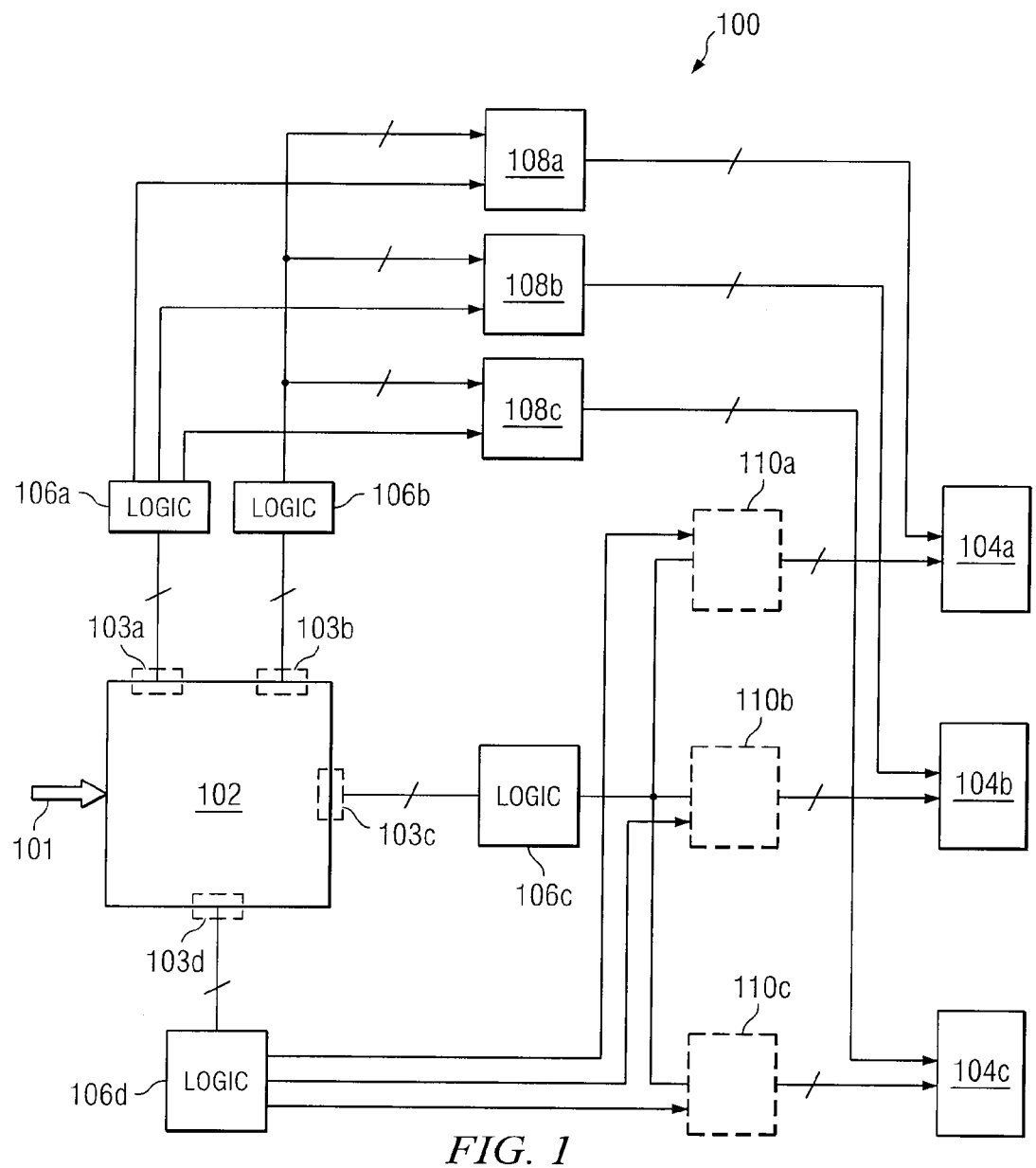
FIG. 1 is a block diagram of a portion of an optical system having a controller communicatively coupled to multiple deformable micromirror devices (DMDs) according to one embodiment of the present disclosure.

FIG. 1 is a block diagram of a portion of an optical system 100 having a controller 102 communicatively coupled to multiple deformable micromirror devices 104a, 104b, and 104c according to one embodiment of the present disclosure. In the illustrated embodiment, optical system 100 is a chip projector that has three DLP® chips; however, any suitable optical system 100 may be used. For example, in some alternative embodiments, optical system 100 may by a three-dimensional DLP® high-definition television (HDTV), a three-dimensional holographic display system, a maskless photolithography system, an optical switch for an optical network, or any other of a variety of optical systems having multiple deformable micromirror devices 104a, 104b, and 104c.

Controller 102 generally refers to any hardware, software, other logic, or any suitable combination of the preceding that is capable of providing control signals to a bus. For example, controller 102 may be included in an application-specific integrated circuit (ASIC). In this example, controller 102 provides control signals to a bus through multiple interfaces 103a, 103b, 103c and 103d. The term bus, as used herein, generally refers to any medium capable of communicatively coupling the components 102, 104, 106, 108 and 110 of system 100. For example, the bus may include metal traces on a circuit board and/or wires. In some alternative embodiments, however, the communication between components 102, 104, 106, 108 and/or 110 may be wireless. The control signals provided by controller 102 to the bus at least partially control the operation of deformable micromirror devices 104. For example, the control signals may control the modulation of light performed by deformable micromirror devices 104.

Controller 102 may also process an input signal 101. Input signal 101 may include, for example, information corresponding to an optical network, a photolithographic pattern, or a display; however, any suitable input signal(s) 101 may be used. Controller 102 generates multiple control signals corresponding to input signal 101, and controller 102 communicates each control signal to the bus through interfaces 103 for receipt by a respective deformable micromirror device 104a, 104b, and/or 104c.

Interfaces 103 generally refer to any input and/or output ports capable of coupling controller 102 to a bus. For example, interfaces 103 may be general-purpose input/output (GPIO) pins of an ASIC chip package. In the example embodiment, controller 102 interfaces through the bus with each deformable micromirror device 104a, 104b, and 104c using a shared set of interfaces 103a, 103b, 103c, and 103d; however, any suitable interface configuration may be used.

Deformable micromirror devices 104a, 104b, and 104c generally refer to any spatial light modulator having an array of deformable mirrors. One example of a deformable micromirror device is the DLP® chip made by Texas Instruments. The DLP® chip contains an array of individually addressable, micron-sized mirrors. Although the optical system 100 of FIG. 1 includes three deformable micromirror devices 104a, 104b, and 104c, any number of deformable micromirror devices 104 may be used. For example, other embodiments may include two or four deformable micromirror devices.

In some conventional systems, multiple deformable micromirror devices are each driven by a respective controller in a one-to-one ratio. For example, conventional projectors having three DLP® chips include a separate ASIC dedicated to each DLP® chip, and thus incur the cost of three separate ASIC chips. Accordingly, teachings of some embodiments of the present disclosure recognize various methods and systems for rendering a single controller 102 capable of interfacing with multiple deformable micromirror devices using time-division-multiplexed signals and a shared bus interface 103.

In some embodiments, using a shared bus interface 103 may provide additional cost savings by further minimizing the pin counts for controller 102. In addition, some such embodiments may include a controller 102 having the same interface 103 configuration and/or the same package dimensions as the controllers of conventional multi-controller systems, thereby facilitating system design. Controller 102 may interface with each deformable micromirror device 104 through a shared bus interface 103 using any of a variety of methods.

In the example embodiment, optical system 100 generally operates as follows. Controller 102 effects the loading of data into each deformable micromirror device 104a, 104b, and 104c. In addition, controller 102 effects the communication of reset pulses to each deformable micromirror device 104a, 104b, and 104c. Each reset pulse causes at least a portion of a receiving deformable micromirror device 104a, 104b, and/or 104c to spatially modulate light in accordance with the previously loaded data. Example methods of using time division multiplexing to load and reset deformable micromirror devices 104 are explained further below with reference to FIGS. 2A through 3.

As illustrated in FIG. 1, optical system 100 further includes several additional components 106, 108, and 110 coupled to the bus between controller 102 and deformable micromirror devices 104. Various embodiments may include all, some, or none of these additional components 106, 108, and 110. In addition, various embodiments may include other components not shown in FIG. 1. In the example embodiment, however, components 106, 108, and 110 generally facilitate the formatting and timing of signals communicated to deformable micromirror devices 104. In this example, the additional components 106, 108, and 110 include logic 106a and 106b, reset devices 108a, 108b, and 108c and data buffers 110a, 110b, and 110c, each component 106, 108, and 110 communicatively coupled to the bus.

Logic 106 generally refers to any hardware, software, or any suitable combination of the preceding, capable of minimizing the number of interface ports 103 used to interface controller 102 with deformable micromirror devices 104. In some embodiments, logic 106a, 106b, 106c, and 106d may be included in controller 102. In the example embodiment, however, logic 106a, 106b, 106c, and 106d are external to controller 102, thereby enabling controller 102 to use the same interface 103 configuration and same package dimensions as some controllers of conventional multi-controller systems, which couple controllers and deformable micromirror devices in a one-to-one ratio.

Reset devices 108 generally refer to any hardware, software, or any suitable combination of the preceding, capable of providing reset pulses that effect the resetting of deformable micromirror devices 104. For example, each reset device 108a, 108b, and 108c may be included in a respective digital-to-analog device (DAD) made by Texas Instruments. In some embodiments, the reset pulses provided by reset devices 108 may include positive or negative voltage peaks of up to approximately 30 volts. In this example, each reset device 108a, 108b, and 108c is communicatively coupled to a respective deformable micromirror device 104a, 104b, and 104c, in a one-to-one ratio; however, any suitable configuration may be used. For example, other embodiments may include only one reset device coupled to each deformable micromirror device 104a, 104b, and 104c. In some other embodiments, reset devices 108a, 108b, and 108c may be internally included within deformable micromirror devices 104a, 104b, and 104c, respectively, or reset devices 108 may be internally included within controller 102.

Data buffers 110 generally refer to any device capable of receiving, storing, and communicating data. In some embodiments, data buffers 110 may be included in controller 102. In this example, each data buffer 110a, 110b, and 110c is communicatively coupled to a respective deformable micromirror device 104a, 104b, and 104c, in a one-to-one ratio; however, any suitable configuration may be used. For example, other embodiments may include only one data buffer coupled to each deformable micromirror device 104a, 104b, and 104c, the data buffer having multiple partitions (e.g., data buffers 110a, 110b, and 110c). In some such embodiments, each partition may have a respective interface(s) or port(s) such that the data buffer may communicate in parallel with respect to each partition, with the deformable micromirror devices 104a, 104b, and 104c.

In the example embodiment, controller 102 effects the loading of data into each deformable micromirror device 104a, 104b, and 104c generally as follows. Controller 102 receives a video display input 101 having red, green, and blue (RGB) channels. In response, controller 102 generates red, green, and blue optical data signals formatted for respective deformable micromirror devices 104a, 104b, and 104c. Controller 102 sequentially communicates the red, green, and blue optical data signals to the bus through shared bus interface 103c. Logic 106c receives the sequentially communicated optical data signals from a particular number of bus lines, and forwards each signal to all data buffers 110 using a different number of bus lines and/or a different format.

While controller 102 communicates the optical data signals to the bus, controller 102 activates one data buffer 110a, 110b, or 110c at a time by communicating one or more chip-select signals to the bus through interface 103d. Logic 106d interprets the chip-select signal(s) received from the bus and forwards the chip-select signal(s) to the appropriate data buffer 110a, 110b, or 110c, thereby activating the receiving data buffer 110a, 110b, or 110c. Using time division multiplexing, controller 102 synchronizes the activation of each data buffer 110a, 110b, 110c with the particular optical data signal present on the bus between logic 106c and buffers 110. In this manner, data buffers 110a, 110b, and 110c receive and temporarily store the red, green, and blue optical data signals, respectively.

At some point, data buffers 110a, 110b, and 110c communicate stored red, green and blue optical data signals to deformable micromirror devices 104a, 104b, and 104c, respectively. The communication between data buffers 110 and deformable micromirror devices 104 may be in parallel. That is, data buffer 110a may communicate a red optical data signal to deformable micromirror device 104a substantially simultaneously with the communication of a green optical data signal from data buffer 110b to deformable micromirror device 104b.

Deformable micromirror devices 104a, 104b, and 104c each receive their respective optical data signals and load internal memory accordingly. Each deformable micromirror device 104a, 104b, and 104c then waits for a reset pulse, which triggers at least a portion of the receiving deformable micromirror device 104a, 104b, and/or 104c to modulate light in accordance with the loaded internal memory.

In some embodiments, controller 102 may generate optical data signals and communicate them to the bus at an interface speed that is faster than the speed at which deformable micromirror devices 104 can receive the optical data signals and/or load the signals into internal memory. In this example, data buffers 110 may enable controller 102 to communicate the optical data signals to the bus using a maximum interface speed that is independent of the maximum interface speed and/or a data load time of deformable micromirror devices 104.

As mentioned previously, various alternative embodiments may not include data buffers 110. For example, controller 102 may alternatively communicate time-division-multiplexed, optical data signals directly to each deformable micromirror device 104a, 104b, and 104c. In some such embodiments, controller 102 may then effect the activation of each deformable micromirror device 104a, 104b, and 104c only when its respective optical data signal is present on the bus. Such alternative embodiments may enable controller 102 to communicate the optical data signals to the bus using an interface speed that is approximately three times as fast as the load time of each deformable micromirror device 104.

In this example, controller 102 effects the communication of reset pulses to each deformable micromirror device 104a, 104b, and 104c generally as follows. Controller 102 activates at least one reset device 108a, 108b, and 108c by communicating one or more chip-select signals to the bus through interface 103a. Logic 106a interprets the chip-select signal(s) received from the bus and forwards the chip-select signal(s) to the appropriate reset device(s) 108a, 108b, and/or 108c.

In this example, controller 102 then communicates at least one reset control signal to the bus through interface 103b. In some embodiments, controller 102 may communicate multiple reset control signals through interface 103b using time division multiplexing. Logic 106b interprets the reset control signal(s) received from the bus, formats the reset control signal(s), and forwards the reset control signal(s) to reset devices 108a, 108b, and 108c. All activated reset devices 108a, 108b, and/or 108c respond to the formatted reset control signal(s) by communicating a corresponding reset pulse through the bus to respective deformable micromirror devices 104a, 104b, and/or 104c.

As mentioned previously, in some alternative embodiments, reset devices 108a, 108b, and 108c may be included within controller 102 or included within respective deformable micromirror devices 104a, 104b, and 104c. In some such alternative embodiments, controller 102 may communicate any of a variety of control signals to accommodate the various alternative configurations of optical system 100. For example, controller 102 may internally communicate reset control signals to reset devices 108 disposed within controller 102, and then controller 102 may communicate corresponding reset pulses to the bus. In some other alternative embodiments, controller 102 may communicate reset control signals through the bus directly to deformable micromirror devices 104a, 104b, and 104c, each of which may internally include a respective reset device 108a, 108b, and 108c.

Each deformable micromirror device 104a, 104b, and 104c, responds to a received reset pulse by spatially modulating light in accordance with the previously loaded data. In some embodiments, controller 102 may load and/or reset only a portion of each deformable micromirror device 104a, 104b, and 104c at a time. For example, deformable micromirror devices 104a, 104b, and 104c, may each be divided into sub-arrays. The processes of loading and resetting deformable micromirror devices 104a, 104b, and 104c, as described previously, may occur one sub-array at a time, as illustrated further with reference to FIGS. 2A through 3.

Figure 2A:
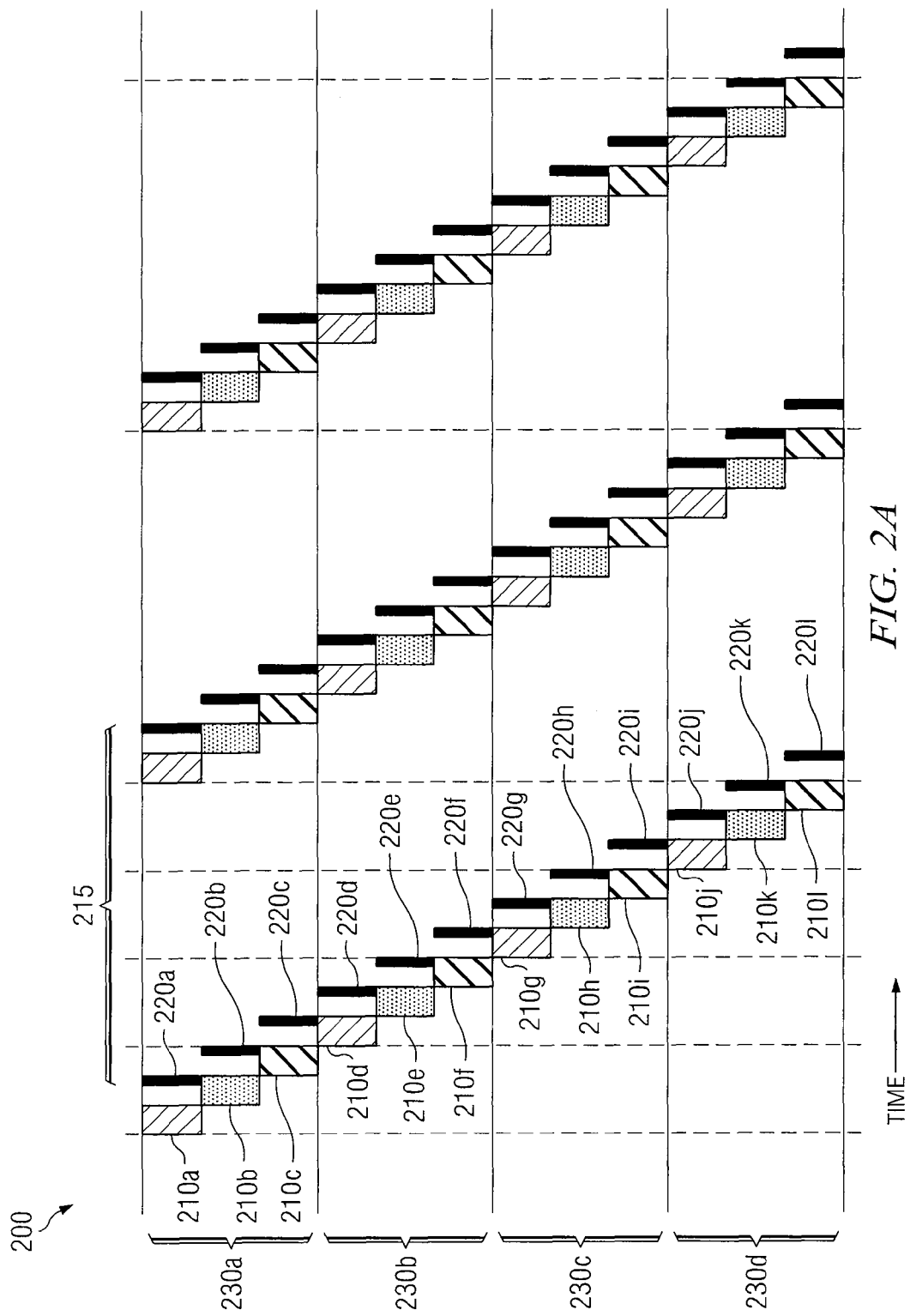
FIG. 2A is a graphical representation of optical data signals communicated to a bus over time by the controller of FIG. 1 and the corresponding reset pulses effected by the controller over time, according to one embodiment of the present disclosure.
Figure 2B:
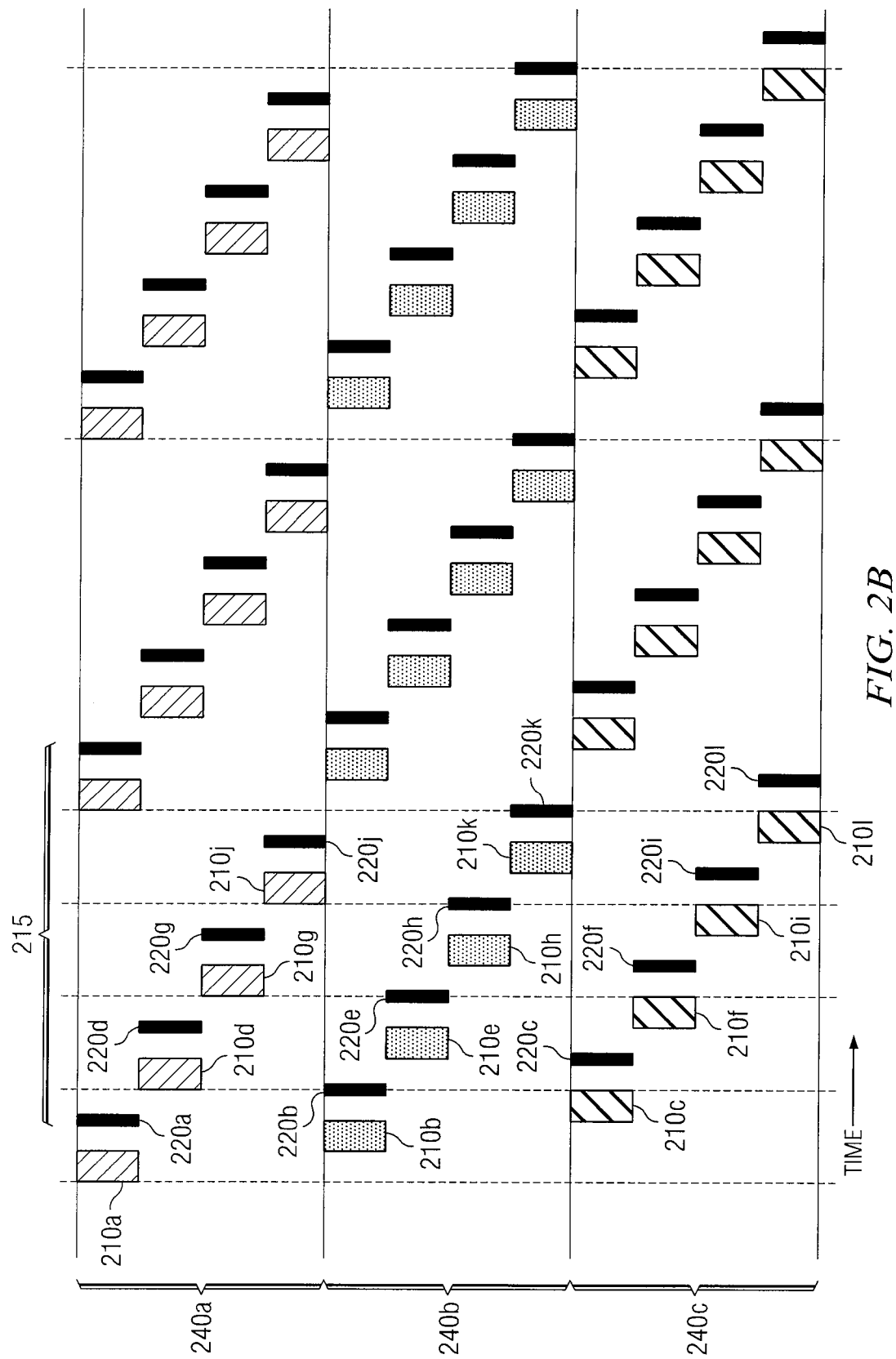
FIG. 2B is a graphical representation of the optical data signals communicated to the bus over time by data buffers, in response to receipt of the optical data signals of FIG. 2A communicated by the controller of FIG. 1.
Figure 3:
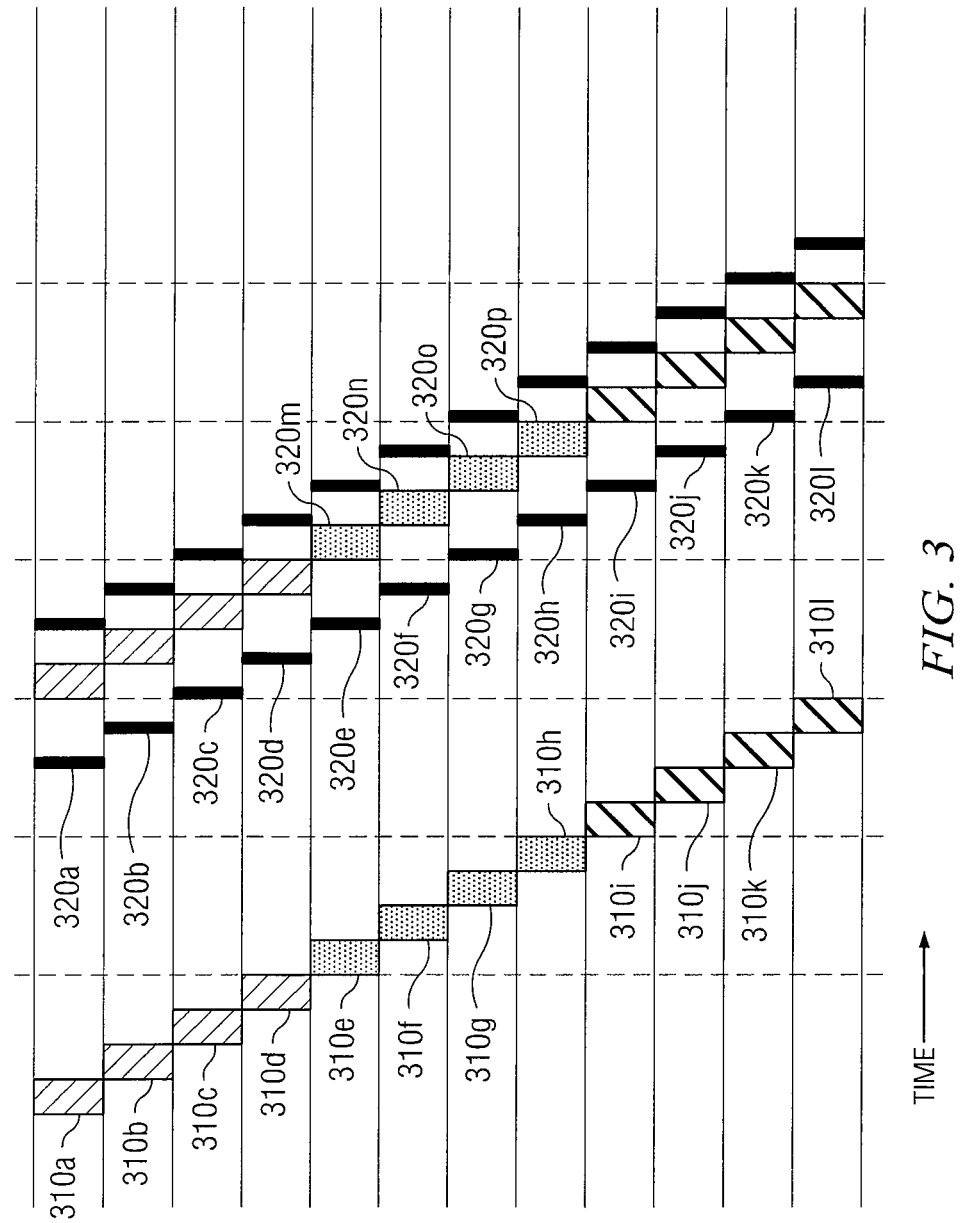
FIG. 3 is a graphical representation of optical data signals communicated to the bus over time by the controller of FIG. 1 and the corresponding reset pulses effected by the controller over time, according to an alternative embodiment of the present disclosure.

FIGS. 2A through 3 are graphical representations of various example methods of using time division multiplexing to load and reset the deformable micromirror devices 104 of FIG. 1. In each graphical representation of FIGS. 2A through 3, the abscissa represents time.

FIG. 2A is a graphical representation of the optical data signals 210 communicated to the bus over time by controller 102, and the corresponding reset pulses 220 effected by controller 102 over time, according to one embodiment of the present disclosure. In this example, each deformable micromirror device 104a, 104b, and 104c is divided into four respective sub-arrays, as indicated by ordinate divisions 230a, 230b, 230c, and 230d; however, deformable micromirror devices 104 may be divided into any suitable number of sub-arrays, or may not be divided into sub-arrays at all.

In this example, controller 102 first communicates optical data signal 210a to the bus. Optical data signal 210a contains next-state information for each mirror of the first sub-array of deformable micromirror device 104a. For example, the next state information may control whether a particular mirror will next reset to an "off-state" or an "on-state" position; however, the next state information may include any suitable number of states, including, for example, three states or a continuum of analog states. Controller 102 then communicates optical data signal 210b to the bus, which contains next-state information for the first sub-array of deformable micromirror device 104b. Controller 102 then communicates optical data signal 210c to the bus, which contains next-state information for the first sub-array of deformable micromirror device 104c.

At substantially the same time that controller 102 begins communicating optical data signal 210c to the bus, controller 102 also effects the reception of reset pulse 220a by deformable micromirror device 104a. At substantially the same time that controller 102 finishes communicating optical data signal 210c to the bus, controller 102 also effects the reception of reset pulse 220b by deformable micromirror device 104b.

Controller 102 then proceeds to communicate optical data signal 210d to the bus. In this example, optical data signal 210a contains next-state information for the second sub-array of deformable micromirror device 104a. At substantially the same time that controller 102 finishes communicating optical data signal 210d to the bus, controller 102 also effects the reception of reset pulse 220c by deformable micromirror device 104c.

This process continues as illustrated in FIG. 2A. In this manner, each red, green, and blue optical data signal has an identical bit sequence with respect to each other optical data signal.

FIG. 2B is a graphical representation of the optical data signals 210 communicated to the bus over time by data buffers 110a, 110b, and 110c, in response to receipt of the optical data signals communicated by the controller 102 of FIG. 2A. In FIG. 2B, the optical data signals are shown in relation to the timing of corresponding reset pulses 220, which are effected by controller 102. The ordinate divisions 240a, 240b, and 240c of FIG. 2B indicate the optical data signals 210 communicated by buffers 110a, 110b, and 110c, respectively.

In this example, each data buffer 110a, 110b, and 110c receives and immediately passes through respective optical data signals 210 to respectively coupled deformable micromirror devices 104a, 104b, and 104c. That is, the interface speed between controller 102 and data buffers 110a, 110b, and 110c is substantially the same as the interface speed between data buffers 110a, 110b, and 110c and respectively coupled deformable micromirror devices 104a, 104b, and 104c; however, any suitable interface speed(s) and/or clock rates for controller 102, deformable micromirror devices 104, and data buffers 110 may be used.

In operation, controller 102 may control the operation of deformable micromirror devices 104 using any of a variety of bit sequences. As shown in FIGS. 2A and 2B, the bit length, or time interval between reset pulses (e.g., time interval 215), for any given sub-array, is approximately twelve times the load time of an optical data signal 210. In this example, the bit time indicates how long deformable micromirror devices 104 will modulate light in accordance with the previously loaded data. In certain instances, it may be necessary for deformable micromirror devices 104a, 104b, and/or 104c to more rapidly change light modulation states.

Controller 102 may effect much shorter bit times by modifying the timing of reset pulses 220 communicated to deformable micromirror devices 104. For example, controller 102 may alternatively effect the instance of reset pulse 220a, in the first sub-array of deformable micromirror device 104a, to coincide with the completion of the data load of optical data signal 210j in the fourth sub-array of deformable micromirror device 104a. In this manner, the time interval between the modified reset pulse 220a and the subsequent reset pulse in the same first sub-array is approximately four times the typical data load time. The bit time resulting from this alternative reset pulse timing is approximately thirty-three percent less than the bit time illustrated in FIGS. 2A and 2B.

Controller 102 may also send a variety of other control signals and/or bit types. For example, controller 102 may globally reset each deformable micromirror device 104a, 104b, and 104c. That is, instead of effecting uniquely timed reset pulses to each sub-array of each deformable micromirror device 104a, 104b, and 104c, controller 102 may alternatively delay any reset pulse until each sub-array of a particular deformable micromirror device 104a, 104b, and/or 104c fully loads respective optical data signals 210. For example, controller 102 may effect a global reset pulse simultaneously to each sub-array of deformable micromirror device 104a sometime during the loading of optical data signal 210k. Similarly, controller 102 may effect a global reset pulse simultaneously to each sub-array of deformable micromirror device 104b sometime during the loading of optical data signal 210l, and so forth.

Controller 102 may rapidly clear all or a portion of the data stored within deformable micromirror devices 104 by sending for example, a global clear bit and/or a fast clear bit to the bus. In this example, a fast clear bit received by deformable micromirror devices 104a, 104b, and/or 104c rapidly clears each mirror of an entire corresponding sub-array with "off-state" information. A global clear bit rapidly globally clears each mirror of the receiving deformable micromirror device 104a, 104b, and/or 104c with "off-state" information. The efficient speed at which deformable micromirror devices 104 may respond to global and fast clear bits may enable any of a variety of potential bit sequences, including, for example, bit sequences that are time-division-multiplexed by controller 102.

The example methods described with reference to FIGS. 2A and 2B involve communicating time-division-multiplexed optical data signals 210 to deformable micromirror devices 104a, 104b, and 104c in an interlaced sequence. Alternative embodiments may involve communicating time-division-multiplexed optical data signals to each sub-array of a particular deformable micromirror device 104a, 104b, or 104c, before proceeding to a subsequent deformable micromirror device 104a, 104b, or 104c, as described further below with reference to FIG. 3.

FIG. 3 is a graphical representation of the optical data signals 310 communicated to the bus by controller 102 over time, and the corresponding reset pulses 320 effected by controller 102 over time, according to an alternative embodiment of the present disclosure. In this example, each deformable micromirror device 104a, 104b, and 104c is divided into four respective sub-arrays, as indicated by each ordinate division; however, deformable micromirror devices 104 may be divided into any suitable number of sub-arrays, or may not be divided into sub-arrays at all.

In this example, controller 102 first communicates optical data signal 310a to the bus. Optical data signal 310a contains next-state information for the first sub-array of deformable micromirror device 104a. Controller 102 then communicates optical data signal 310b to the bus, which contains next-state information for the second sub-array of deformable micromirror device 104a. Controller 102 then communicates optical data signal 310c to the bus, which contains next-state information for the third sub-array of deformable micromirror device 104a. Controller 102 then communicates optical data signal 310d to the bus, which contains next-state information for the fourth sub-array of deformable micromirror device 104a. Once deformable micromirror device receives and loads optical data signal 310d, deformable micromirror device 104a is fully loaded with next-state information. Controller 102 then proceeds, in a similar manner, to sequentially load deformable micromirror device 104b, followed by deformable micromirror device 104c.

As shown in FIG. 3, controller 102 may effect the reset of the various sub-arrays of deformable micromirror device 104a while communicating optical data signals 310 to any other sub-array, or even sub-arrays of other deformable micromirror devices, such as, in this example, deformable micromirror device 104c. In addition, controller 102 may alternatively effect the global reset of each sub-array of any particular deformable micromirror device once the device has fully loaded its respective optical data signals 310.

The example embodiments illustrated in FIGS. 2A through 3 describe various methods of controlling multiple deformable micromirror devices 104 using time-division-multiplexed signals having identical bit sequences. In other words, the pattern of loading and resetting deformable micromirror devices 104 is essentially the same for each deformable micromirror device 104a, 104b, and 104c, though the timing of the patterns with respect to each micromirror device 104a, 104b, and 104c is slightly offset. Some alternative embodiments, however, may use a unique bit sequence for one or all of the multiple deformable micromirror devices 104a, 104b, and 104c. For example, in some such alternative embodiments, controller 102 may delay the communication of optical data signals 310i-310l and reset pulses 320i-320l to deformable micromirror device 104c until after deformable micromirror device 104b loads and resets optical data signals 320m-320p. In this manner, the bit sequence of any particular deformable micromirror device 104a, 104b, and/or 104c may be specific to its particular optical characteristics and/or use. For example, in various display applications, a deformable micromirror device modulating a green light beam may have a different optimal bit sequence than a deformable micromirror device modulating a red light beam. In addition, the various bit sequences may have interactions with respect to each other, such that a particular combination of bit sequence produces a more optimized visual display.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for controlling the settings of respective arrays of light modulators of spatial light modulator devices for respectively modulating different colors in a multi-color display system using a single controller, comprising:
   at the controller, receiving an image input signal including color information of an image to be displayed;
   at the controller and based on the received image input signal, generating sequences of modulator settings data and reset signals for the different color modulations by the respective modulating devices, the data signals defining the settings to be used at a given reset time for the light modulators of a corresponding array, and the reset signals defining the given reset times for loading the settings from the data signals; and
   at the controller, generating a composite signal comprising time division multiplexing of the respective sequences of the modulator settings data and reset signals for the different color modulations;
   communicating the composite signal over a common communication link to the respective modulating devices; and
   loading the data to set the settings of each array for the color to be modulated by that array in coordination with the reset signals for that array according to the time division allocated for that array.

2. A display system comprising:
   a plurality of deformable micromirror devices (DMDs), each comprising an array of micromirrors;
   a bus;
   a single controller communicatively coupled to receive an image display input signal, to generate multiple separate control signals for the respective DMDs corresponding to the received input signal, and to provide the generated separate control signals in a composite time-division multiplexed signal, at a first interface speed, through a shared bus interface to the bus, the separate control signals being operable to control the settings of at least a sub-array of the micromirrors for modulation of light by the respective DMDs;
   a plurality of buffers communicatively coupled to receive the composite time-division multiplexed signal in parallel from the bus, to buffer a portion of the received composite signal corresponding to a different one of the separate signals in response to a time synchronized enable signal, and to deliver the buffered portion, at a second interface speed, to set the settings of the corresponding at least sub-array of the micromirrors of the respective one of the DMDs in response to a reset signal.

3. The display system of claim 2, wherein the second interface speed is less than the first interface speed.

4. The display system of claim 3, wherein the first interface speed is a multiple of the second interface speed equal to the number of DMDs in the plurality of DMDs.

5. The display system of claim 2, wherein the plurality of buffers comprises a plurality of sub-portions of a single buffer component, each sub-portion communicatively coupled to the corresponding respective one of the plurality of DMDs.

6. The display system of claim 2, wherein the controller is an application-specific integrated circuit.

7. A method of controlling settings of a plurality of deformable mirror devices (DMDs) using a common controller, comprising:
   generating respective micromirror settings and reset control signals for same display times for each of the DMDs;
   communicating the respective signals in time division multiplexing over a common communication link; and
   from the time division multiplexed signals, loading the micromirror settings for the respective DMDs under control of the reset signals.

8. The method of claim 7, further comprising:
   enabling a reset signal corresponding to a first one of the plurality of DMDs; and
   communicating a first one of the respective micromirror settings signals substantially simultaneously with the enabling of the reset signal.

9. The method of claim 7, wherein communicating the respective signals includes:
   communicating the respective signals in a composite time-division multiplexed signal in parallel to a plurality of data buffers at a first interface speed; and
   communicating respective ones of the signals from the plurality of data buffers to associated respective ones of the plurality of DMDs at a second interface speed that is less than the first interface speed.

10. The display system of claim 9, wherein the first interface speed is a multiple of the second interface speed equal to the number of DMDs in the plurality of DMDs.

* * * * *